Patented Feb. 17, 1953

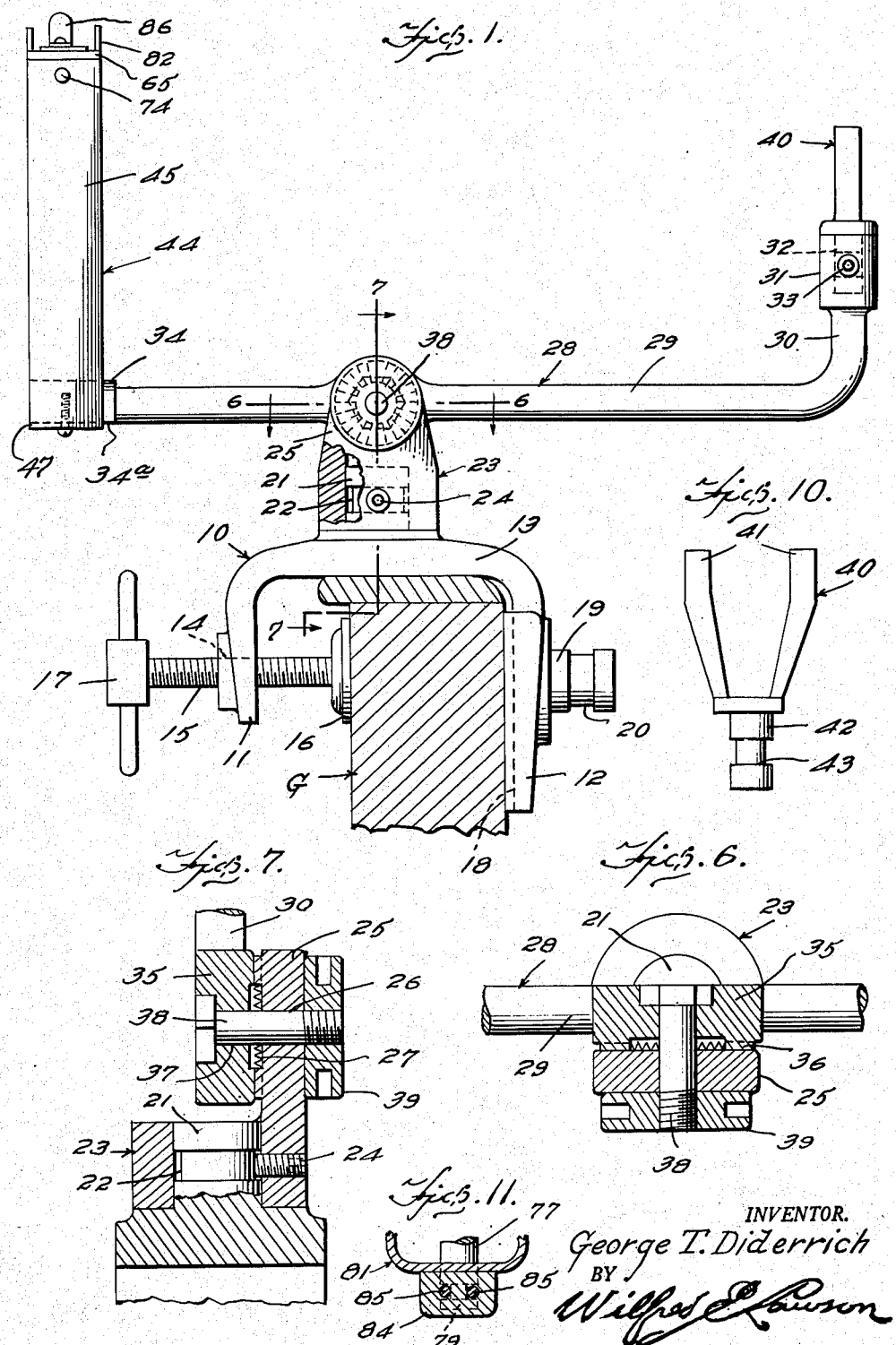

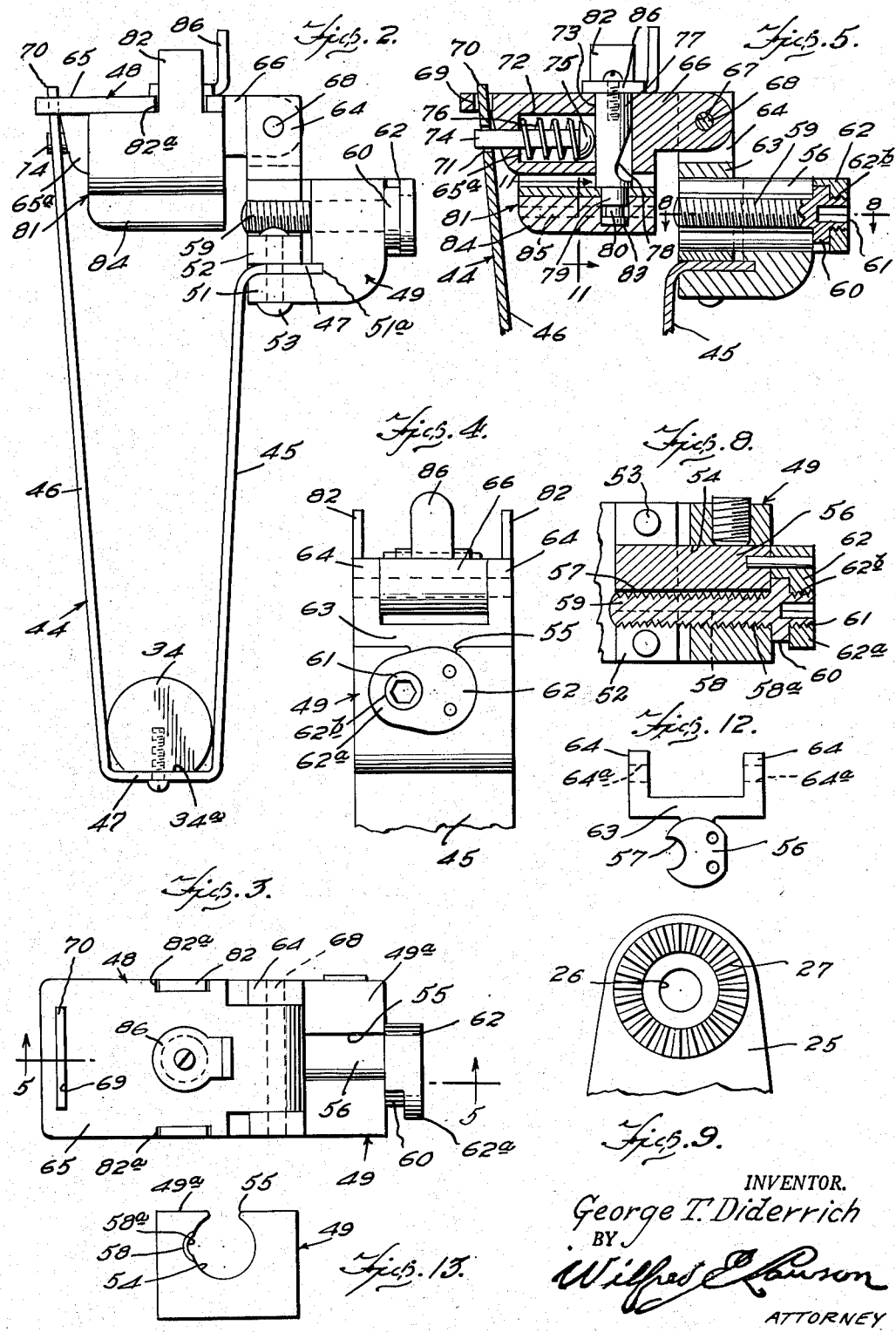

2,628,795

UNITED STATES PATENT OFFICE 2,628,795

FISHING ROD OR POLE HOLDER

George T. Diderrich, Milwaukee, Wis.

Application August 7, 1950, Serial No. 178,007
In Canada June 9, 1950

5 Claims. (Cl. 248—42)

This invention relates generally to the class of supports and is directed particularly to a device of this character designed for holding or supporting a fishing rod in a desired position while fishing.

A particular object of the present invention is to provide an improved holder for a fishing rod which is designed to be easily and quickly attached to the gunwale of a boat and which has means associated therewith for supporting a rod horizontally or at an elevated position and for easily and quickly changing the angle or position of adjustment of the rod between the horizontal and the maximum elevated positions in which the rod may be set.

Another object of the invention is to provide a fishing rod holder comprising a novel type of supporting clamp which may be easily and quickly applied to the vertical edge of the gunwale of a boat or to the horizontally directed edge of a boat seat, from either of which two positions the rod may be arranged to extend outwardly across the gunwale of the boat or from any other support upon which the clamp is placed, in order to position the tip of the rod over the water.

A still further object of the invention is to provide a supporting device for a fishing rod, which device comprises two spaced members or parts, one of which parts is formed to loosely receive the rod in the manner of a stirrup, while the other part is in the form of a locking yoke in which the butt end of the rod is fixed.

Still another object of the invention is to provide a fishing rod holder of the above described character, wherein the said locking yoke comprises two resilient arms between which the butt end of the rod is positioned, together with a novel locking means between and connecting the upwardly directed free ends of such arms, said locking means being so designed that it may be easily and quickly released for the placement of the rod butt into or its removal from position.

Still a further object of the invention is to provide in a device of the character stated, a holding yoke for securing the butt end of the rod, with novel means for changing the spacing between the resilient arms of the yoke to accommodate the rods or rod handles of different diameters.

The invention will be best understood from a consideration of the following detailed description taken in connection with the accompanying drawings forming a part of the specification, with the understanding, however, that the invention is not confined to a strict conformity with the showing of the drawings but may be changed or modified within the scope of the appended claims.

In the drawings:

Figure 1 is a view in side elevation of a fishing rod holder constructed in accordance with the present invention, the same being shown applied or mounted upon a boat gunwale.

Figure 2 is a view in end elevation of the portion of the device for holding or gripping the fishing rod handle.

Figure 3 is a view in top plan of the structure shown in Figure 2.

Figure 4 is a view in elevation of the side of the handle gripping unit as seen from the opposite side of the same as illustrated in Figure 1.

Figure 5 is a vertical section taken substantially on the line 5—5 of Figure 3.

Figure 6 is a view in horizontal section taken substantially on the line 6—6 of Figure 1.

Figure 7 is a view invertical section taken substantially on the line 7—7 of Figure 1.

Figure 8 is a horizontal section taken substantially on the line 8—8 of Figure 5.

Figure 9 is a view of the toothed face of the ear carried by the supporting collar.

Figure 10 is a view in elevation of the fork at the outer end of the pole supporting bar.

Figure 11 is a detailed section taken substantially on the line 11—11 of Figure 5.

Figure 12 is a view in elevation of the outer end of the screw adjusted pin showing thereon the upstanding hinge ears.

Figure 13 is a view in elevation of the outer end of the block in which the screw adjusting pin is slidably engaged.

Referring more particularly to the drawings the numeral 10 generally designates a substantially U-shaped clamp bracket having the two spaced parallel arms 11 and 12 which are connected by the intermediate or yoke portion 13. These arms are spaced to receive between them either the gunwale of a boat, here designated G or the edge of a boat seat, not shown. When the clamp is attached to the gunwale of a boat as illustrated the yoke portion 13 will be horizontally disposed across the top edge of the gunwale and when the bracket is secured to the edge of the boat seat the yoke portion will be vertically disposed across such edge, the arm 12 being positioned upon the top of the seat while the arm 11 will be beneath the same as will be readily apparent.

The arm or jaw 11 of the clamp has a boss 11a upon the outer face and through this boss and the arm is a threaded bore 14 through which is threaded the clamp screw 15 which carries a foot 16 upon its inner end and a cross bar or head 17 upon its outer end to facilitate the rotation thereof.

The opposite arm or jaw 12 has the long contact pads or plates 18 upon its inner face for engagement with the side of the boat or the top of the seat and upon the outer side of this jaw 12 is fixed the perpendicularly extending post 19 which has cut therein the encircling groove 20.

The yoke or intermediate portion 13 of the clamp has extending perpendicularly outwardly therefrom, midway between its ends, a post 21, corresponding to the post 19 and having an encircling groove 22 therein.

The numeral 23 generally designates a collar designed or formed to receive either one of the posts 19—21 and this collar has threaded radially therethrough, a set screw 24 which has its inner end engaged in the groove of the post to hold the collar against removal. This set screw may be of any suitable character but is here shown as a socketed screw designed to be operated by a wrench of the type known as an Allen wrench.

Formed integral with the collar 23 and extending upwardly from one side thereof is an ear 25 which has a bolt aperture 26 therethrough and upon the face of the ear nearest the center of the collar is a circular series of teeth 27 surrounding the aperture and disposed radially thereof.

The numeral 28 generally designates a frame structure consisting of a long bottom bar 29 having a portion of one end turned upwardly to provide a vertical arm 30, which arm terminates in a head 31 which has an upwardly opening axial socket 32. A set screw 33 is threaded into the side of the head for the purpose about to be described.

The opposite end of the bar 29 has a terminal extension 34 of slightly enlarged diameter and the under side of this extension is flattened as indicated at 34a, for the purpose hereinafter set forth.

Intermediate the ends of the bar 29 is formed the disk or plate 35 which has a side face provided with a circular series of teeth 36 encircling a bolt aperture 37, the end of which aperture remote from the teeth 36, is shaped to receive the hexagonal head of a bolt 38, the opposite end of which bolt receives a nut 39.

The numeral 40 generally designates a substantially V-shaped fork or stirrup which comprises the two upwardly diverging arms 41 which are joined to a downwardly directed or depending stem 42 which is of a size to fit snugly in the socket 32. This stem 42 has the encircling grooves 43 in which the set screw 33 engages to hold the fork against escape. When the bar 29 is horizontally disposed and supported by the clamp device, the vertical arm 30 will support the stirrup in upright position so that it may receive and support a part of a fishing pole, the rear or handle end of which is positioned over the extension 34 of the bar and held in place by the structure about to be described.

The numeral 44 generally designates a locking yoke in which is received the grip or butt end of the fishing rod and by which it is firmly held in position while the outer end portion rests in the stirrup or fork 40.

The yoke 44 comprises a substantially U-shaped part made preferably of relatively thin strip steel or the like and having the two long resilient side arms 45 and 46 which are connected at their lower ends by the straight transverse portion 47 which lies against the flat underside 34a of the extension 34 and it is riveted or otherwise suitably secured to such extension so that the arms extend upwardly in divergent relation when the bar is horizontally disposed. As will be readily understood, in the use of the rod supporting device this end of the bar carrying the yoke 44 will be within the boat, that is, when the device is supported upon the gunwale while the fork or stirrup 40 will be disposed outwardly of the gunwale.

The yoke arm 45 is somewhat shorter than the arm 46 and terminates in the outwardly directed lip 47 to which is secured the locking head, generally designated 48, which bridges and locks together the upper ends of the arms 45 and 46 to maintain the handgrip portion of the fishing pole in place within the yoke.

The numeral 49 designates the hinge block which has a length substantially equalling the width of the resilient arm 45 across the upper end of which it positions. Extending across the bottom part of this block is the integral flange 50 on the top of which the outturned lip 47 of the arm is positioned, the block being slotted as indicated at 51a to receive the edge of the lip.

Upon the top of the lip and extending across the inner face of the block is a spacer plate 52 and passing through this plate, the lip 47 and the flange portion 51 are securing rivets 53. By this means the hinge block 49 is fixed to the top end of the flexible arm 45 upon the side thereof remote from the arm 46 and a major portion of this block lies above the lip 47 as shown.

Formed transversally through the block 49 is a guide passage 54 which is directed across the top end of the arm 45 and opens at its top through the top surface 59a of the hinge block, providing the guide slot 55.

Formed to fit slidably in the guide passage 54 is the short round bar 56, a portion of which projects into the slot 55. This bar has formed longitudinally in one side thereof the major portion of an adjusting screw bore 57, the remaining part, or other part, of which bore is formed as indicated at 58 in and longitudinally of the wall of the passage 54 upon one side of such passage. Part of the bore 57 which is formed in and longitudinally of the guide bar 56 is smooth while the portion 58 is screw threaded and in the passage 57 is positioned the adjusting screw 59 which has threaded engagement with the threads 58a in the portion 58 of the screw bore.

The screw 59 carries adjacent to its outer end the circular collar 60 which overlaps the outer end of the guide bar 56 and outwardly of this collar the end of the screw is provided with a wrench socket 61 or other means to facilitate engagement of the screw by a suitable tool for rotating the screw.

Fixed to the outer end of the guide bar 56 is an end plate 62 which has a tongue portion 62a which overlies the outer side of the screw collar 60 and has suitable aperture therethrough as indicated at 62b for the outer or head end of the screw to project through to facilitate the engagement of a suitable wrench therewith. Thus the screw is securely held in place against the side of the guide bar but is free to rotate and when so rotated it will cause the bar 56 to be moved inwardly or outwardly in the passage 54 by reason of the engagement of the threads of the screw with the threads 58a in the outer part 58 of the screw bore 57.

Disposed across the inner end of the guide bar, that is, the end of the guide bar remote from the head of the screw 59, is a hinge plate 63 at opposite ends of which are the upstanding ears 64 which have the aligned hinge pin openings 64a therein. This plate 63 is secured to or carried by the guide bar over which it extends and rests and slides upon the surface 49a at each side of the passage 54. Thus it will be seen that rotation of this screw 59 will affect the forward and backward movement of the bar 58 together with the hinge plate 63.

The numeral 65 designates a hasp plate having extending from one end the hinge ear 66 which positions between the ears 64 and is provided with a transverse bore 67 to receive a hinge pin 68. The opposite end of the hasp plate 65 is provided with a slot 69 in which is received the tongue 70 which forms an extended portion of the upper end of the arm 46. Just below this tongue the arm 46 is provided with a bolt hole 71 for the purpose hereinafter set forth.

It will be seen from the foregoing that the hasp 65 bridges the upper ends of the arms 45—46 to close the clamp or lock the arms together on the handle or butt portion of the fishing rod which is disposed between the arms 45 and 46. By feeding the adjustment screw inwardly or outwardly a variation in the spacing of the arms 45 and 46 may be readily effected to better adapt the gripping unit to the diameter of the fishing rod handle.

The middle section of the hasp 65 is of substantial thickness as indicated at 65a and the forward end of this thickened portion positions against the inner side of the arm 46 when the locking head is closed and has formed therein a bore 66 which is of reduced diameter at its forward end as shown and aligns with the bolt hole 71 in the arm 46.

Formed vertically through the hasp 65 and the thickened body portion 65a and intersecting the inner or back end of the bore 72 is the perpendicular bore 73.

Slidably disposed within the bore 72 is the locking bolt 74 which has the enlarged head 75 upon its inner end and between this head and the forward end of the larger part of the bore 72 is the expansion spring 76 which constantly urges the movement of the bolt 74 inward or away from the arm 46 for disengagement therefrom. Inward movement of the bolt is controlled by the vertically reciprocable pin 77 which extends through the vertical bore 73 across the bolt head 75. The head of the bolt contacts this pin 77 and, when the pin is down and turned to a predetermined position it holds the bolt against inward movement. Adjacent to the lower end of the pin 77 there is formed therein the notch or recess 78 into which the head 75 of the bolt may enter when the pin is rotated to the proper position and pulled upwardly, thus allowing the spring 76 to withdraw the bolt from the hole 71.

The pin 77 is of a length to extend a substantial distance below the portion 65a of the hasp, when it is pushed down and the lower end of this pin has axially extending head 79 which is provided with an encircling recess 80.

The under part 65a of the hasp is positioned within a pin actuating member which is generally designated 81 and is in the form of a substantially U-shaped cradle having the upwardly extending side arms 82 which engage in guide recesses 82a formed in the opposite sides of the hasp. The lower end of the pin 77 positions upon the bottom of this cradle and extends through an opening therein into a socket 83 formed in a heavy rib 84. This rib is welded, brazed or otherwise secured to the bottom of the pin actuator and it has extending longitudinally therethrough a pair of locking pins 85 which engage in the channel 80 around the head 79 to thus secure the pin 77 to the actuator.

Upon the top of the hasp is an upstanding key 86 which is riveted to the top of the bolt controlling pin 77 and provides means for rotating the latter.

As previously explained the present fishing rod holding device may be set up either upon the gunwale of a boat or upon the boat seat. If it is set up on the gunwale the post 21 of the clamp will be disposed vertically or substantially so and the collar 23 will be placed on the post and swung to the desired position to direct the bar 29 transversely of the gunwale. The bar may also be oscillated on the horizontal axis provided by the pivot pin 38 so as to maintain the fishing pole horizontal or with its outer end elevated or depressed as desired. The outer end portion of the pole is disposed within the supporting fork 40 and the inner end or handle is disposed between the arms 45 and 46 of the yoke.

The positioning of the handle of the pole between the arms of the yoke 44 is conveniently effected by retracting the bolt 71 and swinging the hasp plate 65 upwardly on the pivot pin 68.

The release of the bolt from the arm 46 is effected by rotating the latch 86 until the recessed portion 78 of the pin 77 is directed forwardly or it is nearest the head 75 of the bolt whereupon the actuator 81 is pushed upwardly by inserting the finger below the part 84 and pressing upwardly so as to bring the recess 78 in line with the head 75 of the bolt. When this is accomplished the spring 76 is free to shift the bolt inwardly so as to retract the end of the bolt from the bolt hole 71 after which the hasp can be swung upwardly.

After the fishing rod handle is in place in the yoke the arms 45 and 46 may be made to press tightly against the rod by rotating the adjustment screw 59 in the desired direction to shift the guide bar 56 in a direction away from the resilient arm 46. This will cause the hasp to pull the upper end of the arm 46 over toward the arm 45 and thus tightly secure the rod handle in the yoke. Reverse movement of the adjustment screw 59 will, of course, tend to spread the arms 45 and 46 apart to accommodate a larger size handle.

From the foregoing it will be readily apparent that there is provided in the present invention a rod supporting device which is of relatively simple construction and which is, at the same time, strong and durable and can be easily and quickly set in position to maintain a fishing rod in any desired fishing position. If it becomes necessary to remove the rod quickly from the device this is accomplished with a minimum of effort by the actuation of the control pin 77 and the actuator 81 in the manner above set forth.

I claim:

1. A rod gripping means comprising two vertically disposed spaced arms, a member pivotally connected to one arm and detachably coupled to the other arm, and means movable in a line perpendicular to the turning axis of the pivotal connection for shifting the pivotal connection and said member in a direction transversely of the arm with which it is connected.

2. A pole gripping device comprising a member having two portions lying in spaced side by side relation, means coupling two adjacent ends of said portions together, the other ends of the portions being separable, a hinge member, means supporting the hinge member upon the said other end of one of said portions, a hasp, a pivot coupling between the hasp and the hinge member, means for coupling the hasp with the said other end of the other portion, and means separate from the pivot coupling for shifting the said hinge member supporting means toward and away from the said other portion.

3. A pole gripping device as set forth in claim 2, wherein the said hinge member is supported to slide toward and away from the said other portion, and said shifting means comprises a screw feed.

4. A pole gripping device comprising a substantially U-shaped member having two long resilient arms having spaced ends, a body secured to one of said ends, a hinge block slidable on said body to move toward and away from the other one of said ends, a hasp having one end hingedly coupled to said block to swing into bridging position across between said ends, means for detachably coupling the opposite end of the hasp to the said other one of said ends, and means connecting said body with the hinge block for shifting the hinge block toward and away from the said other one of said ends.

5. A device of the character set forth in claim 4, wherein the last stated means comprises a screw swivelly attached to said hinge block and a screw thread carried by said body with which the screw connects.

GEORGE T. DIDERRICH.

REFERENCES CITED

The following references are of record in the file of this patent:

UNITED STATES PATENTS

| Number | Name | Date |
| --- | --- | --- |
| 2,184,583 | Danko | Dec. 26, 1939 |
| 2,483,012 | Koon | Sept. 27, 1949 |
| 2,502,684 | Ward | Apr. 4, 1950 |
| 2,516,759 | Diderrich | July 25, 1950 |